(12) United States Patent
Lin et al.

(10) Patent No.: US 12,519,238 B2
(45) Date of Patent: Jan. 6, 2026

(54) ANTENNA MODULE AND ELECTRONIC DEVICE

(71) Applicant: WISTRON NEWEB CORPORATION, Hsinchu (TW)

(72) Inventors: Hsieh-Chih Lin, Hsinchu (TW); Meng-Kai Wu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 280 days.

(21) Appl. No.: 18/314,846

(22) Filed: May 10, 2023

(65) Prior Publication Data

US 2023/0402757 A1    Dec. 14, 2023

(30) Foreign Application Priority Data

Jun. 8, 2022    (TW) .................................. 111121134

(51) Int. Cl.
*H01Q 9/30*    (2006.01)
*H01Q 1/22*    (2006.01)
*H01Q 9/04*    (2006.01)

(52) U.S. Cl.
CPC ......... *H01Q 9/0421* (2013.01); *H01Q 1/2291* (2013.01); *H01Q 9/30* (2013.01)

(58) Field of Classification Search
None
See application file for complete search history.

(56) References Cited

U.S. PATENT DOCUMENTS

| 8,854,268 | B2 * | 10/2014 | Lin ........................ | H01Q 5/371 |
| | | | | 343/702 |
| 9,461,686 | B2 * | 10/2016 | Yang ...................... | H01Q 1/245 |
| 9,923,263 | B2 | 3/2018 | Yen et al. | |
| 11,329,368 | B2 | 5/2022 | Chen et al. | |
| 2015/0333399 | A1 * | 11/2015 | Huang ................... | H01Q 1/243 |
| | | | | 343/749 |
| 2016/0218421 | A1 * | 7/2016 | Lin .......................... | H01Q 1/50 |

(Continued)

FOREIGN PATENT DOCUMENTS

| TW | 201613173 A | 4/2016 |
| TW | 201733204 A | 9/2017 |

(Continued)

*Primary Examiner* — Dameon E Levi
*Assistant Examiner* — Anh N Ho
(74) *Attorney, Agent, or Firm* — McClure, Qualey & Rodack, LLP (57) ABSTRACT

An antenna module and an electronic device are provided. The antenna module is disposed in a housing of the electronic device. The antenna module includes a first radiating element, a second radiating element, and a feeding element. The first radiating element includes a first radiating portion, a second radiating portion, and a feeding portion. The feeding portion is connected between the first radiating portion and the second radiating portion. A length of the first radiating portion is greater than a length of the second radiating portion. The second radiating element includes a connecting portion, a third radiating portion, and a fourth radiating portion. The connecting portion is connected between the third radiating portion and the fourth radiating portion. A length of the third radiating portion and a length of the fourth radiating portion are not equal to each other.

16 Claims, 10 Drawing Sheets

(56) References Cited

U.S. PATENT DOCUMENTS

2016/0226143 A1* 8/2016 Chen .................. H01Q 1/48
2021/0351509 A1* 11/2021 Lin .................... H01Q 1/245
2022/0336948 A1* 10/2022 Chang ................ H01Q 9/42

FOREIGN PATENT DOCUMENTS

| TW | I732415 B | 7/2021 |
| TW | 202143554 A | 11/2021 |
| TW | 202209754 A | 3/2022 |

* cited by examiner

ANTENNA MODULE AND ELECTRONIC DEVICE

CROSS-REFERENCE TO RELATED PATENT APPLICATION

This application claims the benefit of priority to Taiwan Patent Application No. 111121134, filed on Jun. 8, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna module and an electronic device, and more particularly to an antenna module and an electronic device capable of covering full frequency bands of LTE (long-term evolution).

BACKGROUND OF THE DISCLOSURE

Exterior designs of existing electronic products (such as notebook computers and tablet computers) are developed toward being thinner and more lightweight. However, an internal space of the electronic product that is available for placement of an antenna is very limited due to such miniaturization of the electronic product, which can lead to the antenna not having a sufficient bandwidth.

Therefore, how to overcome the above-mentioned deficiency through an improvement in structural design has become an important issue to be addressed in the related art.

SUMMARY OF THE DISCLOSURE

In response to the above-referenced technical inadequacy, the present disclosure provides an antenna structure and an electronic device having a sufficient bandwidth in spite of a miniaturization trend of electronic products.

In order to solve the above-mentioned problem, one of the technical aspects adopted by the present disclosure is to provide an antenna module, which includes a first radiating element, a second radiating element, and a feeding element. The first radiating element includes a first radiating portion, a second radiating portion, and a feeding portion. The feeding portion is connected between the first radiating portion and the second radiating portion. A length of the first radiating portion is greater than a length of the second radiating portion. The second radiating element and the first radiating portion are separated from each other and coupled with each other. The second radiating element includes a connecting portion, a third radiating portion, and a fourth radiating portion. The connecting portion is connected between the third radiating portion and the fourth radiating portion. A length of the third radiating portion and a length of the fourth radiating portion are not equal to each other. The feeding element is connected to the feeding portion, and the feeding element is used for feeding a signal.

In order to solve the above-mentioned problem, another one of the technical aspects adopted by the present disclosure is to provide an electronic device, which includes a housing and an antenna module disposed in the housing. The antenna module includes a first radiating element, a second radiating element, and a feeding element. The first radiating element includes a first radiating portion, a second radiating portion, and a feeding portion. The feeding portion is connected between the first radiating portion and the second radiating portion. A length of the first radiating portion is greater than a length of the second radiating portion. The second radiating element and the first radiating portion are separated from each other and coupled with each other. The second radiating element includes a connecting portion, a third radiating portion, and a fourth radiating portion. The connecting portion is connected between the third radiating portion and the fourth radiating portion. A length of the third radiating portion and a length of the fourth radiating portion are not equal to each other. The feeding element is connected to the feeding portion, and the feeding element is used for feeding a signal.

Therefore, in the antenna module and the electronic device provided by the present disclosure, by virtue of the second radiating element and the first radiating portion being separated from each other and coupled with each other, and a length of the third radiating portion and a length of the fourth radiating portion being not equal to each other, bandwidths of the antenna module in a low frequency range and in an intermediate-high frequency range can be improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Embodiment

Figure 1:
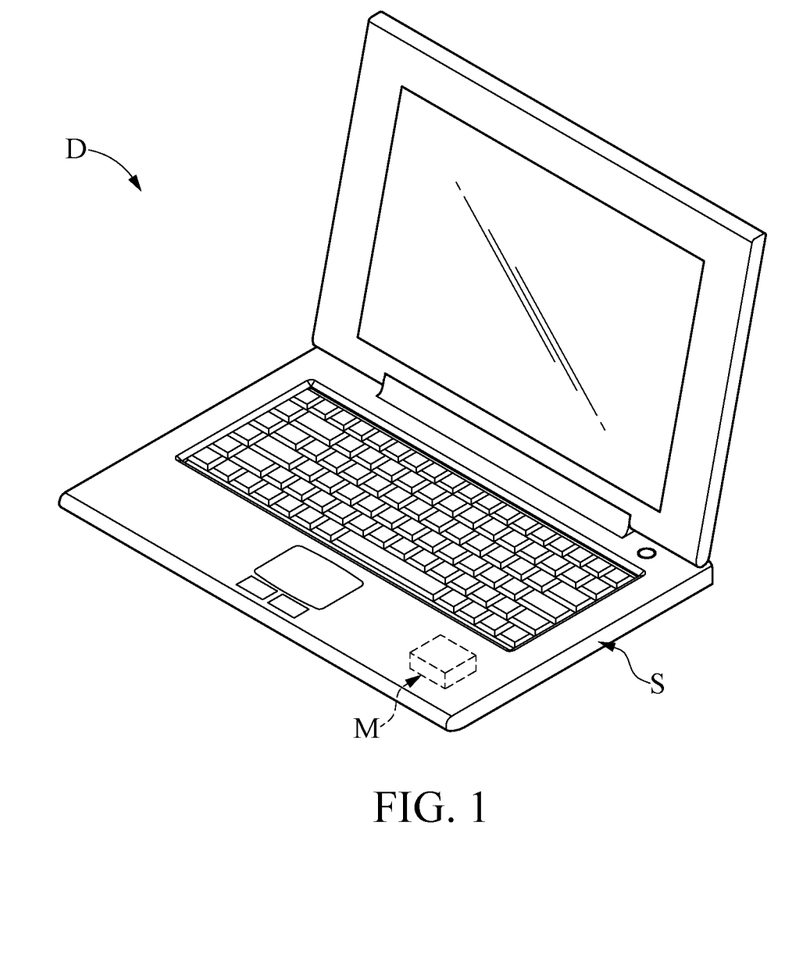
FIG. 1 is a schematic perspective view of an electronic device according to the present disclosure.
Figure 2:
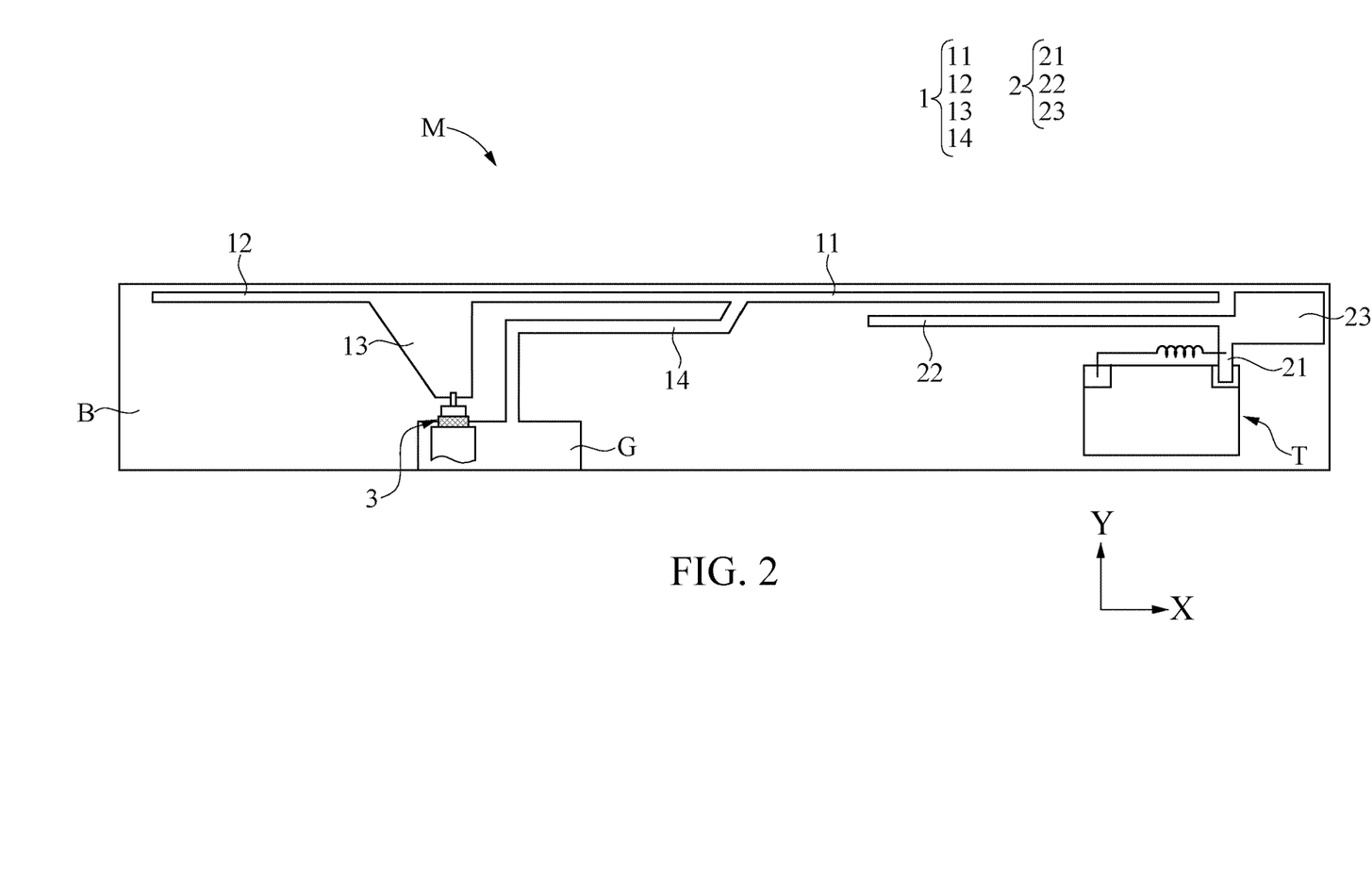
FIG. 2 is a schematic view of an antenna module according to the present disclosure.

Referring to FIG. 1 and FIG. 2, FIG. 1 is a schematic perspective view of an electronic device according to the present disclosure, and FIG. 2 is a schematic view of an antenna module according to the present disclosure. The present disclosure provides an electronic device D, which includes a housing S and an antenna module M disposed in the housing S. Preferably, the antenna module M is disposed on a substrate B. For example, the electronic device D can be a notebook computer, and the substrate B can be an FR4 substrate, a printed circuit board, or a flexible printed circuit board, but the present disclosure is not limited thereto.

As shown in FIG. 2, the antenna module M includes a first radiating element 1, a second radiating element 2, a feeding element 3, and a grounding element G. The first radiating element 1 includes a first radiating portion 11, a second radiating portion 12, and a feeding portion 13. The feeding portion 13 is connected between the first radiating portion 11 and the second radiating portion 12. Moreover, the first radiating portion 11 extends in a positive X-axis direction relative to the feeding portion 13, the second radiating portion 12 extends in a negative X-axis direction relative to the feeding portion 13. A length of the first radiating portion 11 is greater than a length of the second radiating portion 12. Accordingly, the first radiating element 1 can be a monopole antenna, but the present disclosure is not limited thereto. As shown in FIG. 2, the first radiating element 1 further includes a grounding portion 14. The grounding portion 14 is connected between the grounding element G and the first radiating portion 11. Therefore, in the present disclosure, the first radiating element 1 can also be a planar inverted-F antenna. In addition, the first radiating element 1, the second radiating element 2, and the grounding element G can be, for example, a metal sheet, a metal wire, or other conductive material that are electrically conductive. The grounding element G is electrically connected to the housing S of the electronic device D. The feeding element 3 can be a coaxial cable. The feeding element 3 is connected to the feeding portion 13. The feeding element 3 is used for feeding a signal to excite the first radiating element 1, such that the first radiating element 1 generates an operating frequency band ranging from 698 MHz to 6,000 MHz.

Reference is further made to FIG. 2. In the embodiment of the present disclosure, the first radiating element 1 and the second radiating element 2 are both disposed on a same surface of the substrate B, and the second radiating element 2 is disposed adjacent to the first radiating element 1, but the present disclosure is not limited thereto. In other embodiments, the first radiating element 1 and the second radiating element 2 can also be disposed on different surfaces of the substrate B. Regardless of whether the first radiating element 1 and the second radiating element 2 are disposed on the same surface of the substrate B, the second radiating element 2 and the first radiating portion 11 are separated from each other and coupled with each other. The second radiating element 2 includes a connecting portion 21, a third radiating portion 22, and a fourth radiating portion 23. The connecting portion 21 is connected between the third radiating portion 22 and the fourth radiating portion 23. Furthermore, the third radiating portion 22 extends in the negative X-axis direction relative to the connecting portion 21, the fourth radiating portion 23 extends in the positive X-axis direction relative to the connecting portion 21. A length of the third radiating portion 22 and a length of the fourth radiating portion 23 are not equal to each other. Therefore, the second radiating element 2 in the present disclosure can be a T-shaped antenna structure, but the present disclosure is not limited thereto.

Figure 3:
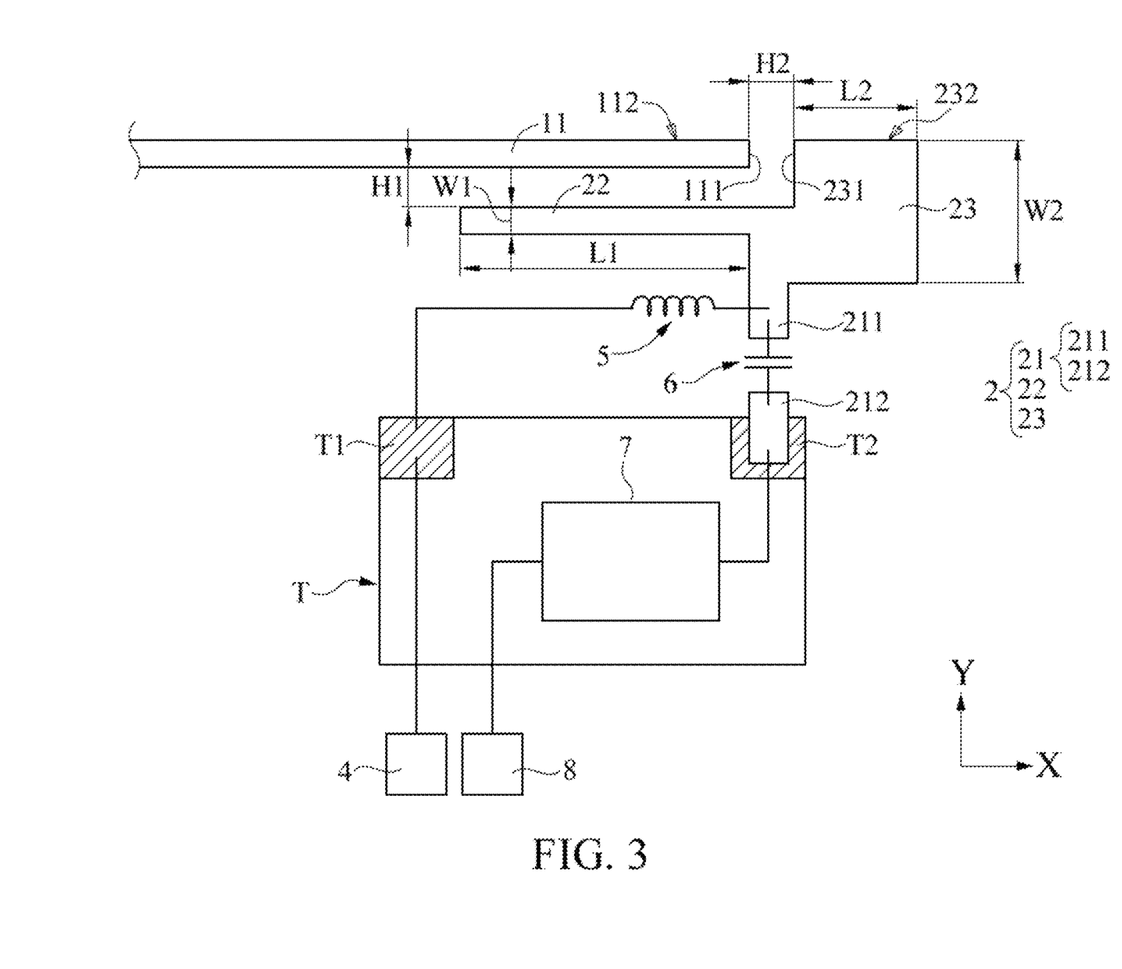
FIG. 3 is a schematic view of a second radiating element and an integrated module of the antenna module according to the present disclosure.

Referring to FIG. 2 and FIG. 3, FIG. 3 is a schematic view of a second radiating element and an integrated module of the antenna module according to the present disclosure. The first radiating portion 11 and the third radiating portion 22 are separated from each other by a first coupling gap H1 along a first direction, and the first direction is parallel to a Y-axis. Accordingly, the first radiating portion 11 and the third radiating portion 22 are separated from each other and coupled with each other for generating an operating frequency band ranging from 617 MHz to 960 MHz. The third radiating portion 22 has a first predetermined width W1 in the first direction, the fourth radiating portion 23 has a second predetermined width W2 in the first direction, and the first predetermined width W1 is smaller than the second predetermined width W2. In the present disclosure, the second predetermined width W2 of the fourth radiating portion 23 is greater than the first predetermined width W1 of the third radiating portion 22, such that a second coupling gap H2 can be defined between an open end 111 of the first radiating portion 11 and one side 231 of the fourth radiating portion 23 along a second direction. The second direction is parallel to the X-axis. That is, the first direction is perpendicular to the second direction. Therefore, the first radiating portion 11 and the fourth radiating portion 23 are separated from each other and coupled with each other for generating an operating frequency band of about 4,000 MHz. Preferably, the first coupling gap H1 and the second coupling gap H2 are smaller than 5 mm. Additionally, the first radiating portion 11 has a first side 112 parallel to the second direction, the fourth radiating portion 23 has a second side 232 parallel to the second direction, and the first side 112 axis flush with the second side 232.

It is worth mentioning that the third radiating portion 22 and the fourth radiating portion 23 are not equal in length. Specifically, the third radiating portion 22 has a first predetermined length L1 in the second direction, the fourth radiating portion 23 has a second predetermined length L2 in the second direction, and the first predetermined length L1 is greater than the second predetermined length L2.

Reference is further made to FIG. 2 and FIG. 3. The antenna module M further includes a proximity sensing circuit 4, an inductor 5, a capacitor 6, a switching circuit 7, and a control circuit 8. The proximity sensing circuit 4 is electrically connected to the second radiating element 2. The connecting portion 21 includes a first arm 211 and a second arm 212. The inductor 5 is connected in series between the first arm 211 and the proximity sensing circuit 4. The capacitor 6 is connected in series between the connecting portion 21 and the switching circuit 7. More specifically, the capacitor 6 is connected between in series between the first arm 211 and the second arm 212. The switching circuit 7 is electrically connected to the connecting portion 21. Specifically, the switching circuit 7 is electrically connected between the second arm 212 and the control circuit 8. The second radiating element 2 serves as a sensor electrode (a sensor pad) through configuration of the proximity sensing circuit 4, such that the proximity sensing circuit 4 can be used to sense a distance between an object (such as body parts of a user) and the antenna module M. As such, the electronic device D is capable of sensing whether or not a human body is adjacent to the antenna module M, so as to adjust a radiation power of the antenna module M. In this way, a specific absorption rate (SAR) at which electromagnetic wave energy is absorbed per unit mass by an organism can be prevented from being exceedingly high.

Furthermore, the inductor 5 can serve as a RF choke to prevent interference between the proximity sensing circuit 4 and the antenna structure that includes the first radiating element 1, the second radiating element 2, and the feeding element 3. The capacitor 6 can serve as a DC block to prevent a DC signal generated by the proximity sensing circuit 4 from flowing into a system (i.e., an internal circuit of the electronic device D) and affecting or damaging other components inside the electronic device D. The capacitor 6 can also prevent the DC signal generated by the proximity sensing circuit 4 from direct grounding through the switching circuit 7. In addition, the capacitor 6 can adjust impedance matching of the antenna module M.

Figure 5:
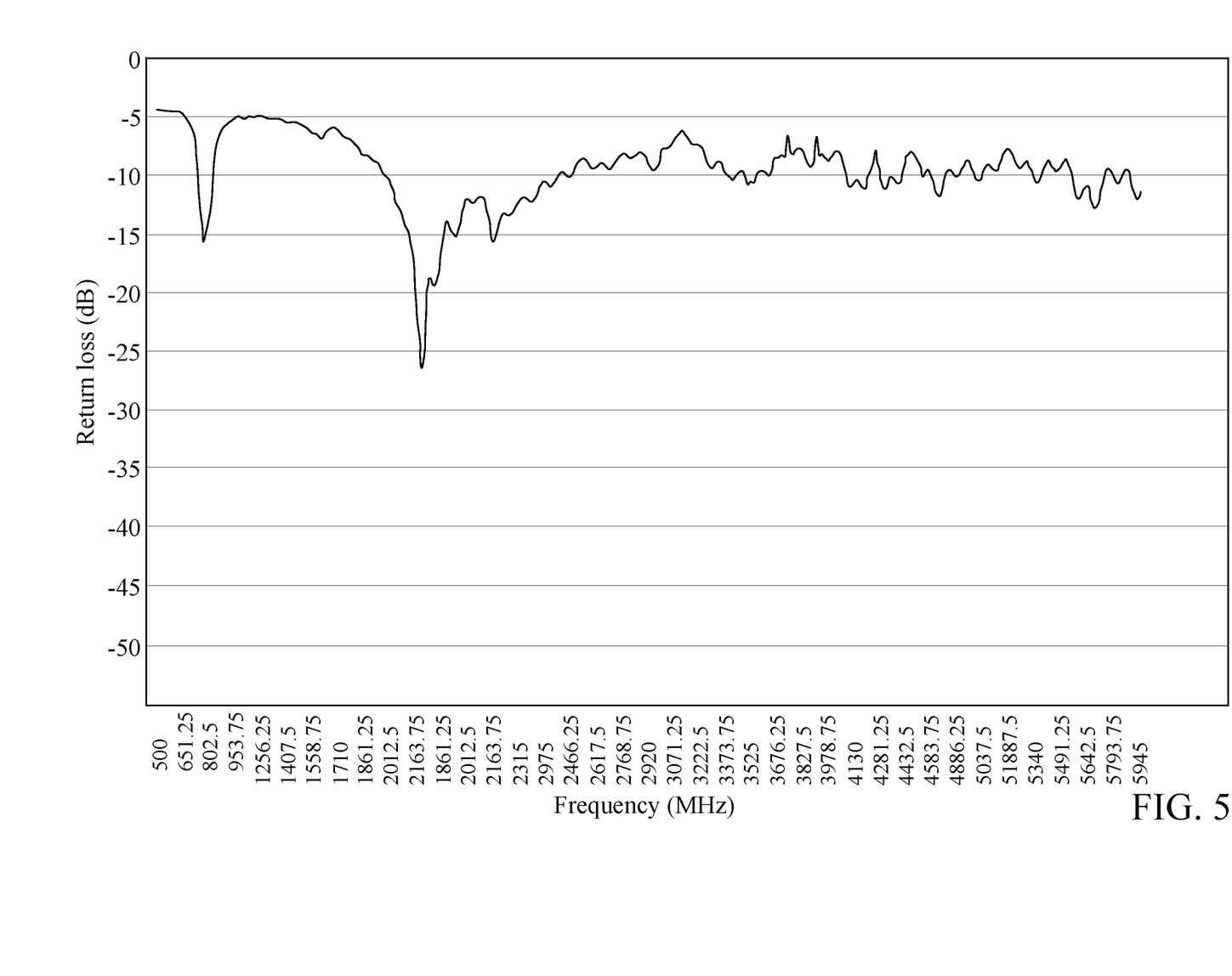
FIG. 5 is a curve diagram showing return loss of the antenna structure only having a first radiating element according to the present disclosure.
Figure 6:
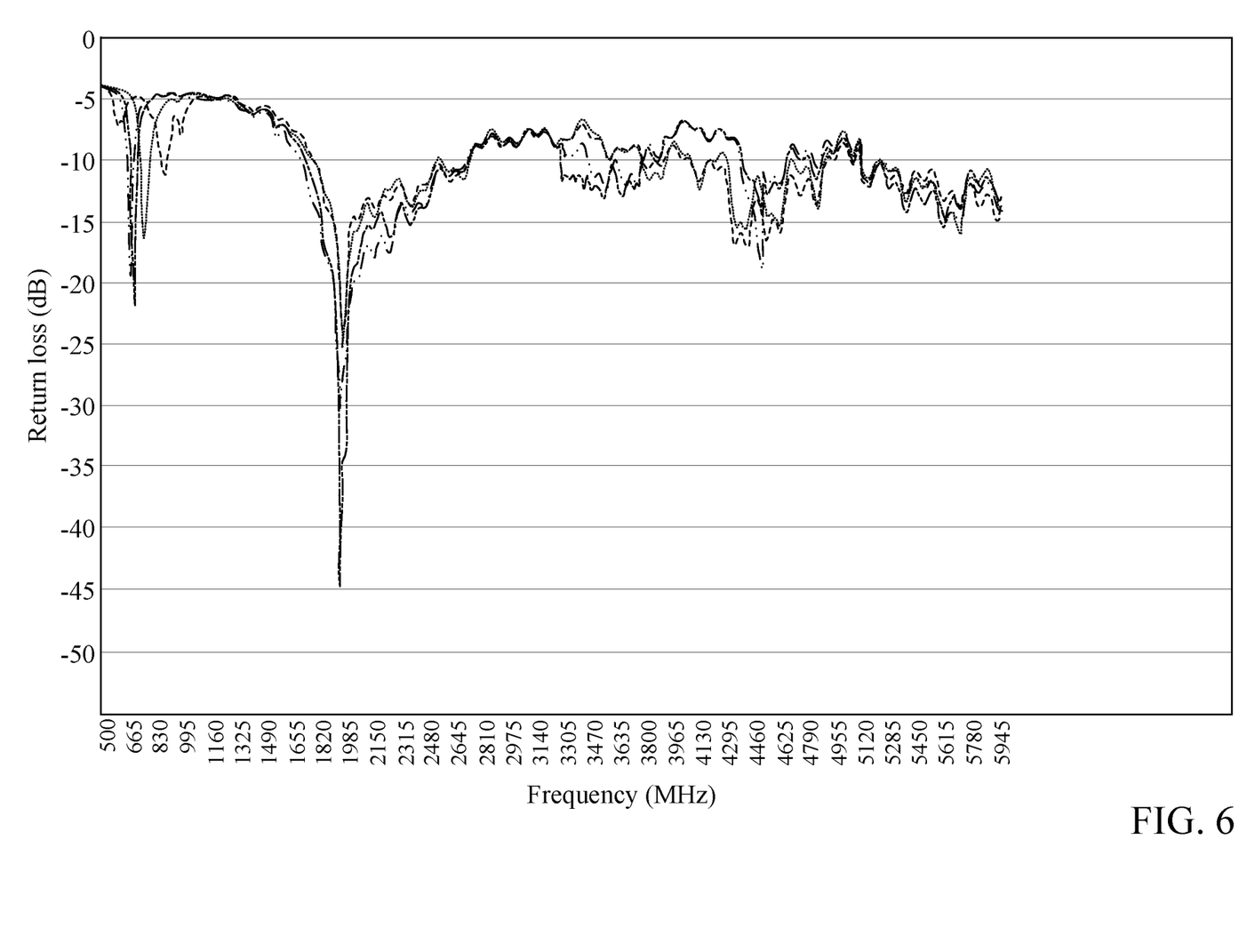
FIG. 6 is a curve diagram showing the return loss of the antenna structure having the first radiating element and the second radiating element according to the present disclosure.

Referring to FIG. 5 and FIG. 6, FIG. 5 is a curve diagram showing return loss of the antenna structure only having a first radiating element according to the present disclosure, and FIG. 6 is a curve diagram showing the return loss of the antenna structure having the first radiating element and the second radiating element according to the present disclosure. Comparing FIG. 5 and FIG. 6, the antenna module M only having the first radiating element 1 (as shown in FIG. 5) is shown to have an issue of insufficient bandwidth in a low frequency range (617 MHz to 960 MHz) and an intermediate-high frequency range (3,000 MHz to 6,000 MHz). After the second radiating element 2 is added (as shown in FIG. 6), through coupling between the first radiating portion 11 of the first radiating element 1 and the third radiating portion 22 of the second radiating element 2, and through cooperation of the first coupling gap H1 and the second coupling gap H2, a bandwidth in the low frequency range generated by the antenna module M can be improved. Moreover, the first radiating portion 11 of the first radiating element 1 and the fourth radiating portion 23 of the second radiating element 2 can be coupled with each other to improve a bandwidth in the intermediate-high frequency range generated by the antenna module M.

Figure 4:
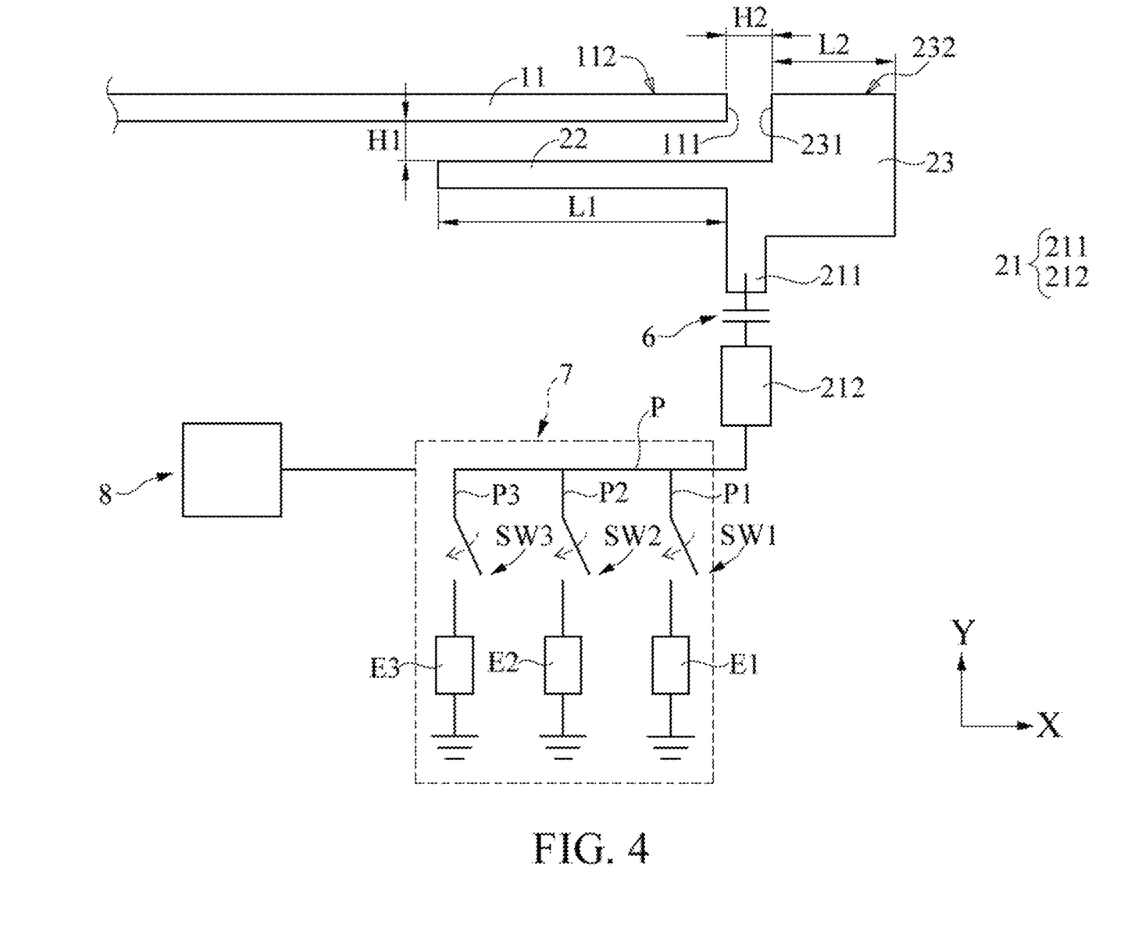
FIG. 4 is a schematic view of the second radiating element and a switching circuit of the antenna module according to the present disclosure.

Referring to FIG. 3 and FIG. 4, FIG. 4 is a schematic view of the second radiating element and a switching circuit of the antenna module according to the present disclosure. The switching circuit 7 is one part of a multi-functional integrated circuit T. The second radiating element 2 is electrically connected to one pin T1 of the integrated circuit T through the first arm 211, and then the second radiating element 2 is electrically connected to the proximity sensing circuit 4 through the pin T1. In addition, the second radiating element 2 is electrically connected to another pin T2 of the integrated circuit T through the second arm 212, and then the second radiating element 2 is electrically connected to the switching circuit 7 through the pin T2. The switching circuit 7 includes a signal transmission path P and multiple grounding paths (such as a first path P1, a second path P2, and a third path P3 in FIG. 7). The first path P1, the second path P2, and the third path P3 are electrically connected to the signal transmission path P, but a quantity of the grounding paths is not limited in the present disclosure. The first path P1, the second path P2, and the third path P3 are connected in series to a first passive element E1, a second passive element E2, and a third passive element E3, respectively. The first path P1, the second path P2, and the third path P3 are also connected in series to a first switch SW1, a second switch SW2, and a third switch SW3, respectively. For example, the first passive element E1, the second passive element E2, and the third passive element E3 can each be an inductor, a capacitor, or a resistor, but the present disclosure is not limited thereto. Through configuration of the first passive element E1, the second passive element E2, and/or the third passive element E3, the electronic device D can adjust an operating frequency band, the impedance matching, a return loss value, and/or a radiation efficiency of the antenna module M.

Reference is further made to FIG. 4. In the present disclosure, the switching circuit 7 includes four operating modes (which are a first mode, a second mode, a third mode, and a fourth mode). The control circuit 8 can control the switching circuit 7 to switch among various modes, so as to adjust the operating frequency band of the antenna module M. Specifically, in the first mode, the second radiating element 2 is electrically connected to the control circuit 8. At this time, the first switch SW1 in the first path P1, the second switch SW2 in the second path P2, and the third switch SW3 in the third path P3 are in non-conducting states. That is to say, the first mode can also be regarded as a state in which the switching circuit 7 is not functional. In the second mode, the second radiating element 2 is grounded through the first path P1. At this time, the first switch SW1 in the first path P1 is in a conducting state, and the second switch SW2 in the second path P2 and the third switch SW3 in the third path P3 are in the non-conducting states. In the third mode, the second radiating element 2 is grounded through the second path P2. At this time, the second switch SW2 in the second path P2 is in the conducting state, and the first switch SW1 in the first path P1 and the third switch SW3 in the third path P3 are in the non-conducting states. In the fourth mode, the second radiating element 2 is grounded through the third path P3. At this time, the third switch SW3 in the third path P3 is in the conducting state, and the first switch SW1 in the first path P1 and the second switch SW2 in the second path P2 are in the non-conducting states. For example, the antenna module M can generate a first operating frequency band when the switching circuit 7 is switched to the first mode, the antenna module M can generate a second operating frequency band when the switching circuit 7 is switched to the second mode, and a central frequency of the first operating frequency band generated in the first mode is different from a central frequency of the second operating frequency band generated in the second mode.

Figure 7:
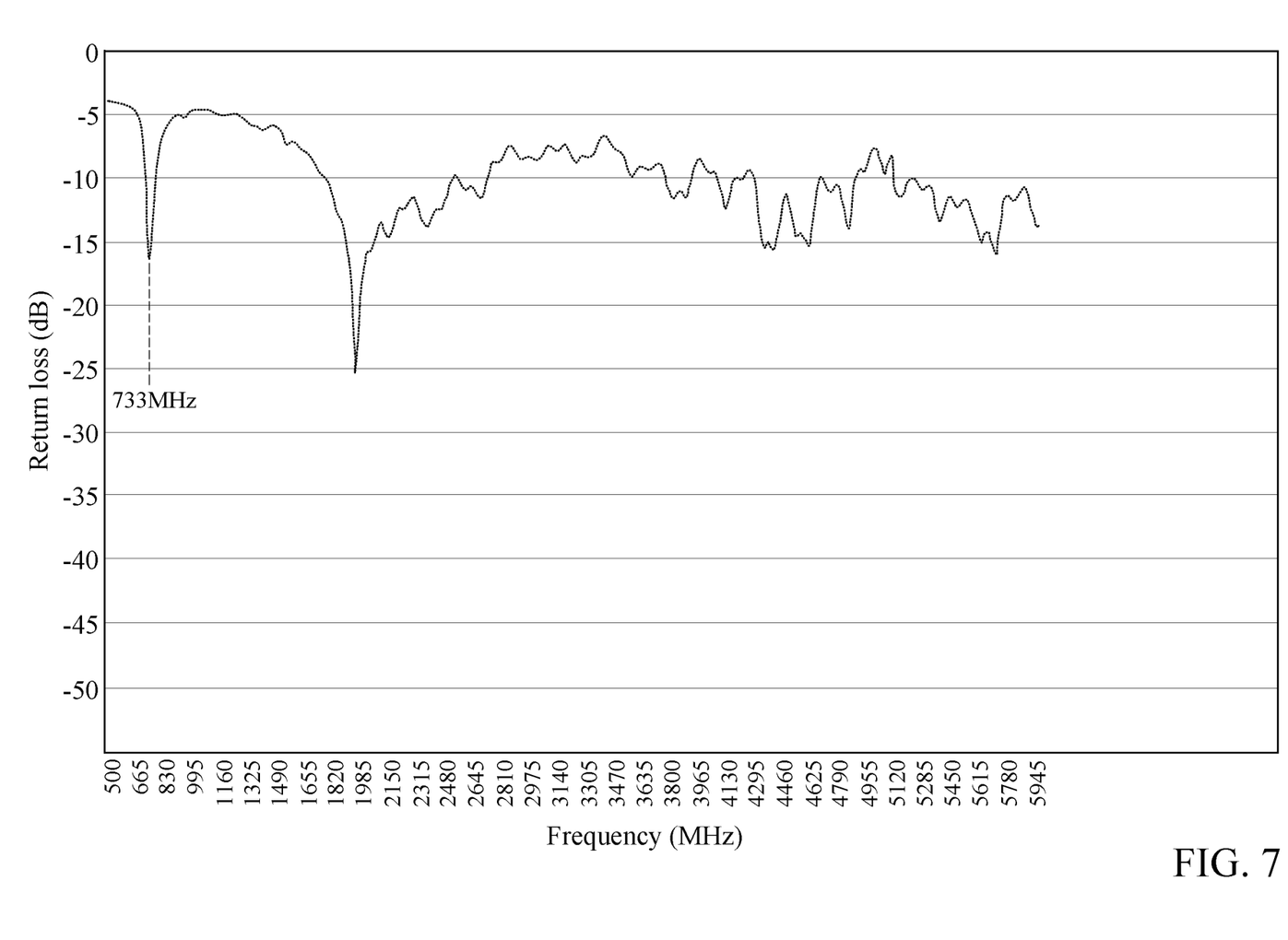
FIG. 7 is a curve diagram showing the return loss of the antenna structure in a first mode according to the present disclosure.
Figure 8:
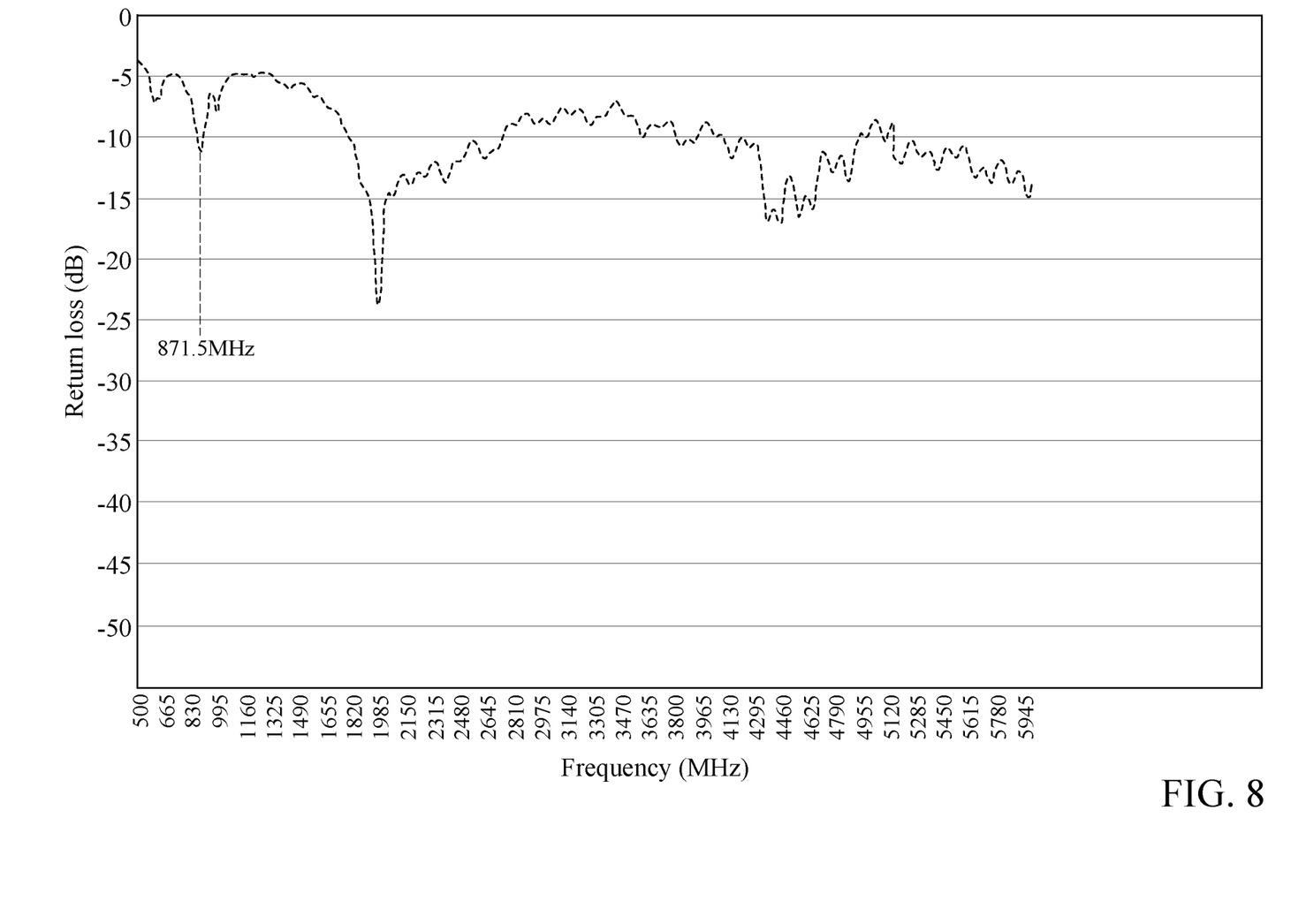
FIG. 8 is a curve diagram showing the return loss of the antenna structure in a second mode according to the present disclosure.
Figure 9:
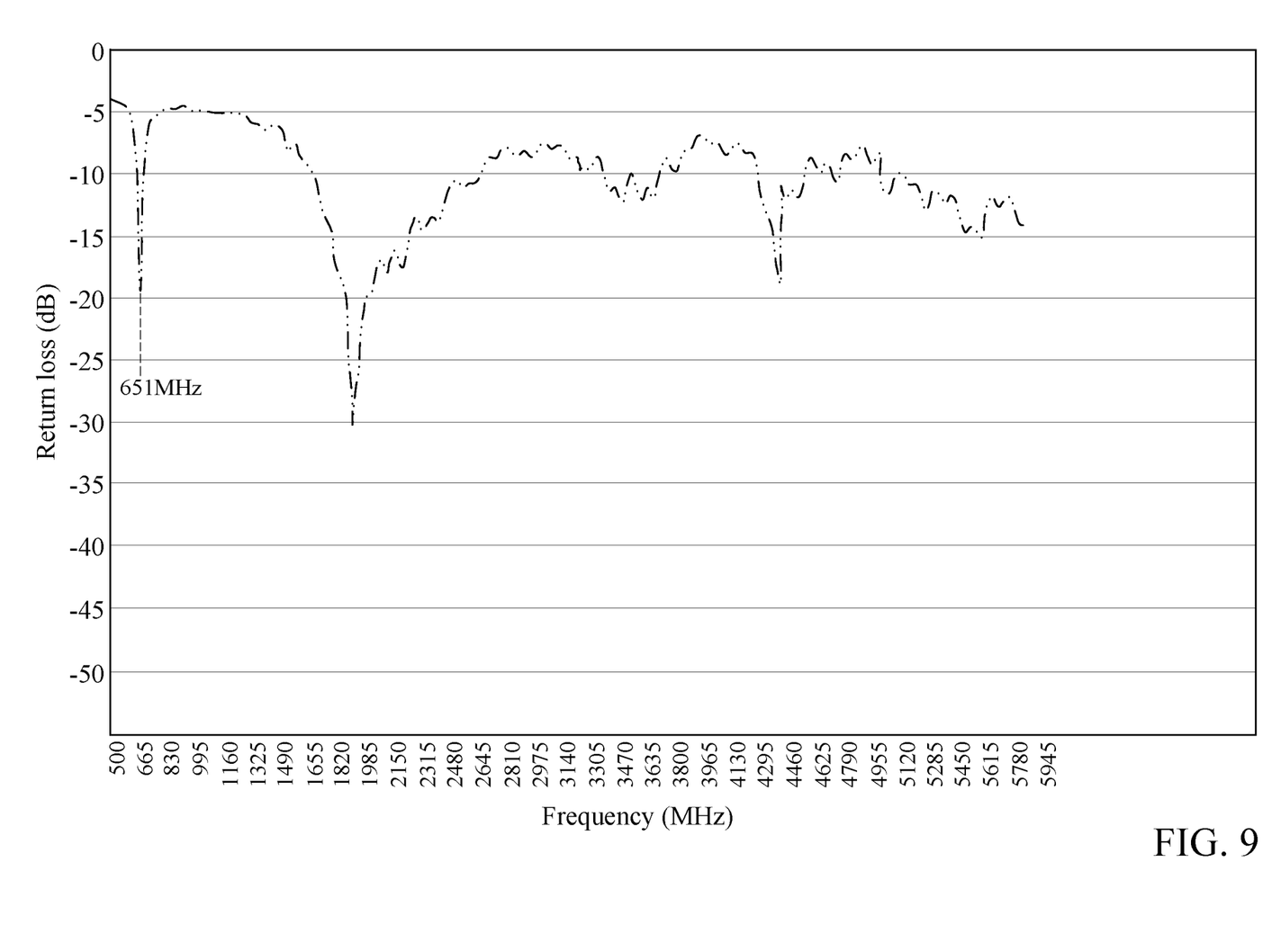
FIG. 9 is a curve diagram showing the return loss of the antenna structure in a third mode according to the present disclosure.
Figure 10:
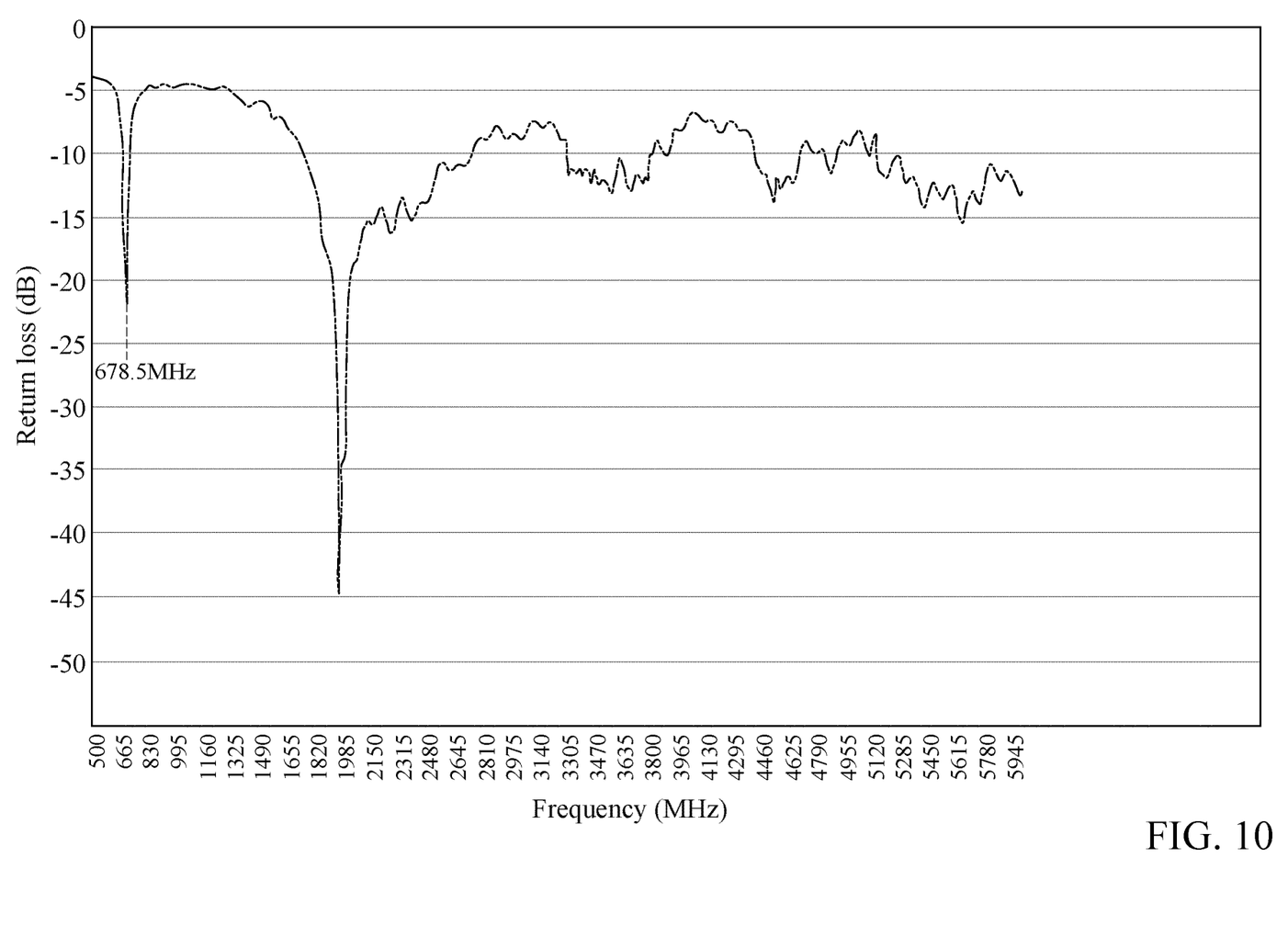
FIG. 10 is a curve diagram showing the return loss of the antenna structure in a fourth mode according to the present disclosure.

Furthermore, referring to FIG. 7 to FIG. 10, FIG. 7 is a curve diagram showing the return loss of the antenna structure in a first mode according to the present disclosure, FIG. 8 is a curve diagram showing the return loss of the antenna structure in a second mode according to the present disclosure, FIG. 9 is a curve diagram showing the return loss of the antenna structure in a third mode according to the present disclosure, and FIG. 10 is a curve diagram showing the return loss of the antenna structure in a fourth mode according to the present disclosure. As shown in FIG. 7, in the first mode, a central frequency of the operating frequency band generated by the antenna module M in the low frequency range is 733 MHz. As shown in FIG. 8, in the second mode, a central frequency of the operating frequency band generated by the antenna module M in the low frequency range is 871.5 MHz. As shown in FIG. 9, in the third mode, a central frequency of the operating frequency band generated by the antenna module M in the low frequency range is 651 MHz. As shown in FIG. 10, in the fourth mode, a central frequency of the operating frequency band generated by the antenna module M in the low frequency range is 678.5 MHz. Therefore, the central frequency of the operating frequency band generated by the antenna module M can be adjusted by switching to different paths (i.e., the first path P1, the second path P2, and the third path P3) of the switching circuit 7, thereby achieving an effect of increasing the bandwidth.

It should be noted that, in the aforementioned description, the central frequency of the operating frequency band generated by the antenna module M in the low frequency range is exemplified for illustrative purposes. By switching to different paths (i.e., the first path P1, the second path P2, and the third path P3) of the switching circuit 7, the operating frequency band generated by the antenna module M can be adjusted to not only achieve a bandwidth increase in the low frequency range (so as to cover a frequency range from 617 MHz to 960 MHz), but also achieve a bandwidth increase in the intermediate-high frequency range (so as to cover a frequency range from 3,000 MHz to 6,000 MHz).

Beneficial Effects of the Embodiment

In conclusion, in the antenna module M and the electronic device D provided by the present disclosure, by virtue of the second radiating element 2 and the first radiating portion 11 being separated from each other and coupled with each other, and the third radiating portion 22 and the fourth radiating portion 23 being not equal in length, the bandwidths of the antenna module M in the low frequency range and in the intermediate-high frequency range can be improved.

Through coupling between the first radiating portion 11 of the first radiating element 1 and the third radiating portion 22 of the second radiating element 2, and through cooperation of the first coupling gap H1 and the second coupling gap H2, the bandwidth in the low frequency range generated by the antenna module M can be improved. Moreover, the first radiating portion 11 of the first radiating element 1 and the fourth radiating portion 23 of the second radiating element 2 can be coupled with each other to improve the bandwidth in the intermediate-high frequency range generated by the antenna module M.

Furthermore, by switching to different paths (i.e., the first path P1, the second path P2, and the third path P3) of the switching circuit 7, the operating frequency band generated by the antenna module M can be adjusted to not only achieve the bandwidth increase in the low frequency range (so as to cover the frequency range from 617 MHz to 960 MHz), but also achieve the bandwidth increase in the intermediate-high frequency range (so as to cover the frequency range from 3,000 MHz to 6,000 MHz).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An antenna module, comprising:
 a first radiating element including a first radiating portion, a second radiating portion, and a feeding portion, wherein the feeding portion is connected between the first radiating portion and the second radiating portion, and a length of the first radiating portion is greater than a length of the second radiating portion;
 a second radiating element separated from and coupled with the first radiating portion, wherein the second radiating element includes a connecting portion, a third radiating portion, and a fourth radiating portion, the connecting portion is connected between the third radiating portion and the fourth radiating portion, and a length of the third radiating portion and a length of the fourth radiating portion are not equal to each other;
 a feeding element connected to the feeding portion, wherein the feeding element is used for feeding a signal; and
 a switching circuit, a proximity sensing circuit, an inductor, and a capacitor, wherein the proximity sensing circuit is electrically connected to the connecting portion of the second radiating element, the inductor is connected in series between the connecting portion and the proximity sensing circuit, and the capacitor is connected in series between the connecting portion and the switching circuit.

2. The antenna module according to claim 1, wherein the first radiating portion and the third radiating portion are separated from each other by a first coupling gap along a first direction, an open end of the first radiating portion and the fourth radiating portion are separated from each other by a second coupling gap along a second direction, and the first direction is perpendicular to the second direction.

3. The antenna module according to claim 2, wherein the first coupling gap and the second coupling gap are smaller than 5 mm.

4. The antenna module according to claim 2, wherein the third radiating portion has a first predetermined width in the first direction, the fourth radiating portion has a second predetermined width in the first direction, and the first predetermined width is smaller than the second predetermined width.

5. The antenna module according to claim 2, wherein the third radiating portion has a first predetermined length in the second direction, the fourth radiating portion has a second predetermined length in the second direction, and the first predetermined length is greater than the second predetermined length.

6. The antenna module according to claim 1, wherein the first radiating element is a monopole antenna or a planer inverted F-shaped antenna.

7. The antenna module according to claim 1, wherein, in response to the switching circuit being switched to a first mode, the antenna module is configured to generate a first operating frequency band, and in response to the switching circuit being switched to a second mode, the antenna module is configured to generate a second operating frequency band, and a central frequency of the first operating frequency band generated in the first mode is different from a central frequency of the second operating frequency band generated in the second mode.

8. The transceiver according to claim 1, wherein the brain is movable along a longitudinal axis of the first piggy foot.

9. The electronic device according to claim 8, wherein the first radiating portion has a first side parallel to the second direction, the fourth radiating portion has a second side parallel to the second direction, and the first side axis flush with the second side.

10. The electronic device according to claim 8, wherein the first coupling gap and the second coupling gap are smaller than 5 mm.

11. The electronic device according to claim 8, wherein the third radiating portion has a first predetermined width in the first direction, the fourth radiating portion has a second predetermined width in the first direction, and the first predetermined width is smaller than the second predetermined width.

12. The electronic device according to claim 8, wherein the third radiating portion has a first predetermined length in the second direction, the fourth radiating portion has a second predetermined length in the second direction, and the first predetermined length is greater than the second predetermined length.

13. An electronic device, comprising:
a housing; and an antenna module disposed in the housing, wherein the antenna module includes:
a first radiating element including a first radiating portion, a second radiating portion, and a feeding portion, wherein the feeding portion is connected between the first radiating portion and the second radiating portion, and a length of the first radiating portion is greater than a length of the second radiating portion;
a second radiating element separated from and coupled with the first radiating portion, wherein the second radiating element includes a connecting portion, a third radiating portion, and a fourth radiating portion, the connecting portion is connected between the third radiating portion and the fourth radiating portion, and a length of the third radiating portion and a length of the fourth radiating portion are not equal to each other;
a feeding element connected to the feeding portion, wherein the feeding element is used for feeding a signal; and
a switching circuit, a proximity sensing circuit, an inductor, and a capacitor, wherein the proximity sensing circuit is electrically connected to the connecting portion of the second radiating element, the inductor is connected in series between the connecting portion and the proximity sensing circuit, and the capacitor is connected in series between the connecting portion and the switching circuit.

14. The electronic device according to claim 13, wherein the first radiating element is a monopole antenna or a planer inverted F-shaped antenna.

15. The electronic device according to claim 13, wherein, in response to the switching circuit being switched to a first mode, the antenna module is configured to generate a first operating frequency band, and in response to the switching circuit being switched to a second mode, the antenna module is used for generating a second operating frequency band, and a central frequency of the first operating frequency band generated in the first mode is different from a central frequency of the second operating frequency band generated in the second mode.

16. The electronic device according to claim 15, further comprising a control circuit electrically connected to the switching circuit, wherein the switching circuit is controlled by the control circuit to switch between the first mode and the second mode.

* * * * *